United States Patent [19]
Chen et al.

[11] Patent Number: 5,514,490
[45] Date of Patent: May 7, 1996

[54] SECONDARY LITHIUM BATTERY USING A NEW LAYERED ANODE MATERIAL

[75] Inventors: Jin-Ming Chen, Taichung; Yingjeng J. Li, Pingtung; Weir-Mirn Hurng, Hsinchu, all of Taiwan; M. Stanley Whittingham, Vestal, N.Y.

[73] Assignee: Industrial Technology Research Institute, Chutung, Taiwan

[21] Appl. No.: 298,510

[22] Filed: Aug. 30, 1994

[51] Int. Cl.⁶ ................................. H01M 6/16
[52] U.S. Cl. .................. 429/191; 429/194; 429/218; 429/223; 429/232; 420/417; 423/608
[58] Field of Search ................... 429/194, 191, 429/218, 232, 223; 420/417; 423/608

[56] References Cited

U.S. PATENT DOCUMENTS

| | | | |
|---|---|---|---|
| 4,985,317 | 1/1991 | Adachi et al. | 429/191 |
| 5,310,553 | 5/1994 | Simon et al. | 429/212 |
| 5,316,875 | 5/1994 | Murai et al. | 429/194 |

FOREIGN PATENT DOCUMENTS

| | | |
|---|---|---|
| 3-29206 | 2/1991 | Japan . |
| 3-81908 | 4/1991 | Japan . |

OTHER PUBLICATIONS

Yingjeng James Li, et al., "Hydrothermal synthesis of new metastable phases: preparation and intercalation of a new layered titanium phosphate", Elsevier Science Publishers B.V. 1993/pp. 391–395 (month N/A).

*Primary Examiner*—Prince Willis, Jr.
*Assistant Examiner*—M. Nuzzolillo
*Attorney, Agent, or Firm*—W. Wayne Liaugh

[57] ABSTRACT

An improved lithium secondary battery using a novel layered titanium phosphate having the formula of $TiO(OH)(H_2PO_4)$, or LTP, as anode material, and $LiCoO_2$, $LiNiO_2$, or other appropriate material, as cathode. A stable operating voltage of 3-volt can be obtained from the resultant lithium secondary battery. The layered titanium phosphate is prepared by first reacting a tetramethylammonium hydroxide ($N(CH_3)_4OH$) solution containing orthophosphoric acid with titanium dioxide in a low temperature hydrothermal reaction to form a tetramethylammonium form of layered titanium phosphate, or $NMe_4TP$, which serves as the precursor of LTP. The precursor $NMe_4TP$ is then placed in a concentrated hydrochloric acid at room temperature to obtain a high purity LTP via a cation exchange reaction. Each of the $Li_xLTP$ chemical unit, which is formed after the intercalation of LTP with lithium ions, can contain two lithium ions, thus excellent lithium intercalation characteristic can be achieved as a result. Furthermore, no lithium dendrites are formed during the recharging operation which tend to puncture the partition membranae separating the anode and the cathode; therefore, the secondary lithium battery allows a safe recharging operation to be maintained.

12 Claims, 6 Drawing Sheets

UNIT: CM

SECONDARY LITHIUM BATTERY USING A NEW LAYERED ANODE MATERIAL

FIELD OF THE INVENTION

The present invention relates to an improved secondary lithium battery. More particularly, the present invention relates to an improved secondary lithium battery using a new anode material containing a new layered titanium phosphate. The present invention also relates to a new layered titanium phosphate that can be used as an anode material in a secondary lithium battery, and method of preparing the same.

BACKGROUND OF THE INVENTION

A battery may comprise one or more individual cells. Typically, a single electrochemical cell is composed of a negative electrode (anode) and a positive electrode (cathode) separated by an electrolytic solution. When the cell is discharging, the chemical energy is converted to electrical energy. Initially, batteries are assembled with high energy chemical compounds, and the stored chemical energy is withdrawn as electrical energy at some later time. Primary batteries are batteries that sold in their charged state and discarded without recharge. When primary batteries are completely discharged, they are discarded.

Secondary batteries, on comparison, belong to a different category of batteries from the primary batteries, in that the secondary batteries can discharge their energy and be recharged. The chemical, electrochemical, and physical properties associated with both types of batteries are the same, the main difference being the nature of the electrochemically active material used in the system. Recharging in secondary batteries is accomplished by forcing an external current through the battery in a direction opposite to the current flow during discharge so as to restore the electrochemically active material to their original charged condition. A secondary battery can discharge and be recharged as many as several thousand times depending on the use and operating condition. This is the chief advantage of the secondary battery relative to the primary battery; however, a secondary battery typically provides lower energy density and high initial cost.

More recently, primary lithium batteries have been widely used in portable electronic products, and have maintained a stable market share. On the other hand, the commercialization of secondary lithium batteries has been relatively slow in coming. The main problem associated with secondary lithium batteries discouraging their market acceptance, is the formation of lithium dendrites during the recharging process. The lithium dendrites so formed can puncture through the partition membrane separating the anode and the cathode; this causes short circuiting and thus raising serious safety concerns. To improve the safety of using secondary lithium batteries, other metals have been researched to replace lithium as the anode material. One of the more commonly employed approaches is to use lithium alloy as anode material in a lithium ion system. An example is to use to Li-Al alloy as the primary anode material in a secondary lithium battery. A good anode material should provide good capacity for the intercalation and deintercalation of the lithium ions. Carbon powders have been known to provide a good base material for use as anode.

U.S. Pat. No. 4,985,317, the content thereof in incorporated herein by reference, discloses a lithium ion-conductive solid electrolyte consisting of a compound represented by the chemical formula of $Li_{1+x}M_xTi_{2-x}(PO_4)_3$, wherein M can be Fe or Al, a compound represent by the chemical formula of $Li_{1+y}Ti_2Si_yP_{3-y}O_{12}$, or a compound obtained by mixing a compound represented by the chemical formula of $LiTi_2(PO_4)_3$ and any other lithium compound. However, the '317 does not address the issue of providing an improved anode material for use in secondary lithium batteries. Japanese Laid Open Patent Applications JP3-81908 and JP3-29206 also disclosed the use of titanium phosphate electrolytes; however, they also did not address the issue of providing an improved anode material for use in secondary lithium batteries.

SUMMARY OF THE INVENTION

The primary object of the present invention is to provide an secondary lithium battery with improved safety. More particularly, the primary object of the present invention is to provide an improved secondary battery using a novel anode material that will eliminate the problem of lithium dendrite formation and improve the safety of battery operation. The secondary lithium battery disclosed in the present invention also provides many other desirable properties, such as stable discharge voltage and high discharge capacity.

In the lithium secondary battery disclosed in the present invention, a novel layered titanium phosphate $[TiO(OH)(H_2PO_4)]$ is used as anode material, replacing the conventional lithium metal or lithium-based alloys, and $LiCoO_2$, $LiNiO_2$, or other appropriate material, is used as cathode. Such a novel layered titanium phosphate can be called as the hydrogen form of layered titanium phosphate. A stable operating voltage of 3-volt can be obtained from the lithium secondary battery of the present invention. The layered titanium phosphate disclosed in the present invention provides excellent lithium intercalation characteristics. This can be illustrated by an intercalation reaction between n-butyl lithium and the layered titanium phosphate (LTP) which is described as follows:

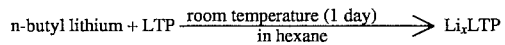

$(x_{max} = 2)$

Since each chemical unit of the intercalated $Li_xLTP$ can contain two lithium ions, excellent lithium intercalation characteristic can be provided. Furthermore, because no lithium dendrites are formed during the recharging operation, the present invention eliminates an important safety concern in operating secondary lithium batteries.

In the present invention, the new layered titanium phosphate $[TiO(OH)(H_2PO_4)$, or LTP] can be prepared by first reacting a tetramethylammonium hydroxide $(N(CH_3)_4OH)$ solution containing orthophosphoric acid with titanium dioxide in a low temperature hydrothermal reaction to form tetramethylammonium form of layered titanium phosphate, or $NMe_4TP$, which serves as a precursor of LTP. The precursor $NMe_4TP$ is then placed in a concentrated hydrochloric acid at room temperature to obtain a high purity LTP via a cation exchange reaction. The hydrogen form of layered titanium phosphate so prepared contains crystalline water, which must be removed before it is used as an anode material for secondary lithium battery. The lattice distance of LTP containing crystalline water is 10Å; after the water molecules are removed, the lattice distance of LTP changes to 8.9Å.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses an improved lithium secondary battery using a novel layered titanium phosphate [TiO(OH)(H$_2$PO$_4$), or LTP] as anode material, and LiCoO$_2$, LiNiO$_2$, or other appropriate material, is used as cathode. A stable operating voltage of 3-volt can be obtained from the lithium secondary battery of the present invention during battery discharge. The layered titanium phosphate is prepared by first reacting a tetramethylammonium hydroxide (N(CH$_3$)$_4$OH) solution containing orthophosphoric acid with titanium dioxide in a so-called low temperature hydrothermal reaction to form a tetramethylammonium form of layered titanium phophate, or NMe$_4$TP, which forms the precursor of LTP. The precursor NMe$_4$TP is then placed in a concentrated hydrochloric acid at room temperature to obtain a high purity LTP via a cation exchange reaction. During intercalation, each of the Li$_x$LTP chemical unit can take in up to two lithium ions, thus excellent lithium intercalation characteristic can be achieved as a result. Furthermore, no lithium dendrites are formed during the recharging operation which tend to puncture the partition membranae separating the anode and the cathode; therefore, the present invention allows a safe recharging operation to be maintained.

In the test embodiments of the present invention, the anode and cathode materials are respectively coated on aluminum foils to form the desired anode and cathode. Two types of electrolytes were used: the first type was 1M LiClO$_4$ dissolved in a 1:1 mixture solvent of EC (ethylene carbonate) and DMC (dimethyl carbonate); the second type of electrolyte was 1M LiClO$_4$ dissolved in a 1:1 mixture solvent of PC (propylene carbonate) and DEC (diethyl carbonate).

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1

0.05 mol of tetramethylammonium hydroxide (N(CH$_3$)$_4$OH) in aqueous solution was mixed with 0.15 mol of orthophosphoric acid (H$_3$PO$_4$). Then 0.05 mol of titanium dioxide in the anatase form (i.e., native TiO$_2$) was added to the reaction mixture. After thorough mixing, the mixture was sealed inside a pressure reactor at 6~7 atm and heated in an oven at 180° C. for three days. After cooling, rinsing, filtration, and drying, a tetramethylammonium form of layered titanium phosphate (NMe$_4$TP) was obtained.

Figure 1:
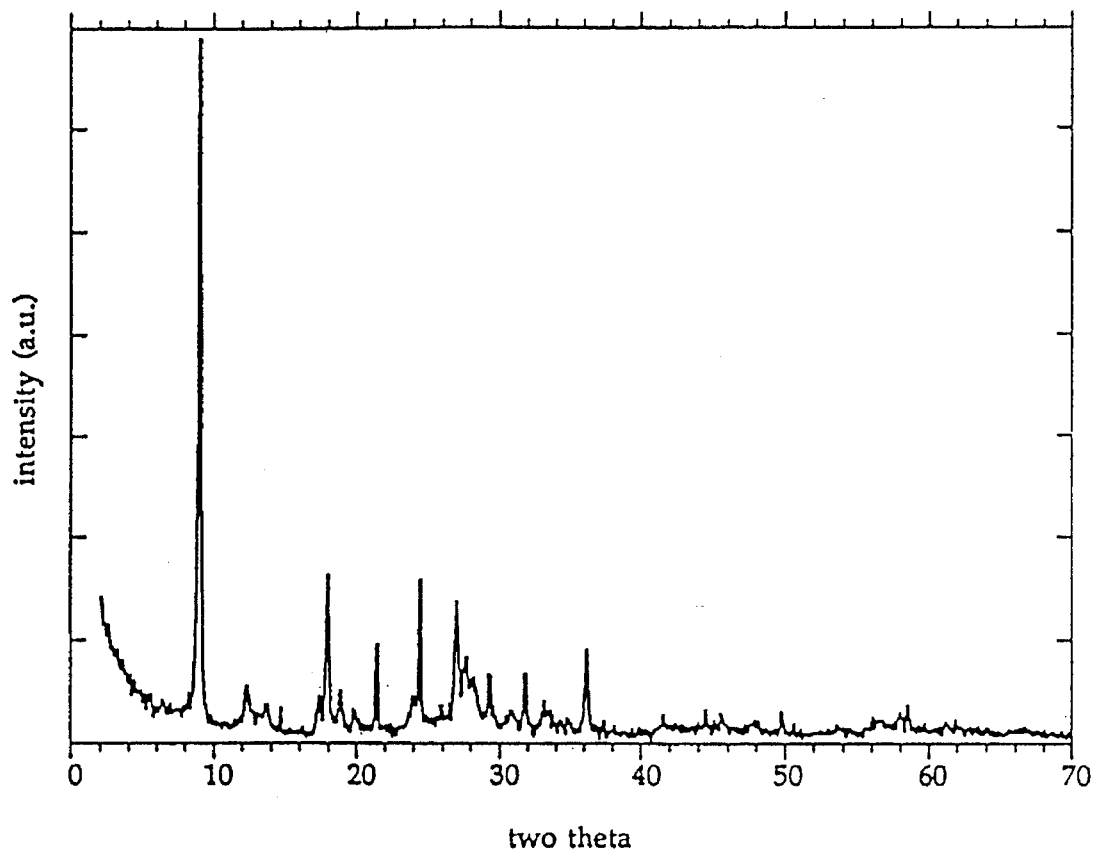
FIG. 1 shows an X-ray diffraction plot of the layered titanium phosphate [TiO(OH)(H$_2$PO$_4$), or LTP] disclosed in the present invention containing one crystalline water molecule.

The NMe$_4$TP was placed in a concentrated hydrochloric acid at room temperature for five days to effectuate a cation exchange reaction to form the hydrogen form of the new layered titanium phosphate [TiO(OH)(H$_2$PO$_4$), or LTP]. FIG. 1 shows an X-ray diffraction plot of the layered titanium phosphate so prepared which contains one crystalline water molecule. The crystalline water was removed before the layered titanium phosphate was used as an anode material in the preparation of a secondary lithium battery, as the crystalline water would react with lithium, resulting in the formation of a strong basic environment and adversely affecting the property of the anode material. The lattice distance of LTP containing crystalline water measured from the X-ray diffraction was 10Å; after the water molecules are removed, the lattice distance of LTP changed to 8.9Å.

Figure 2:
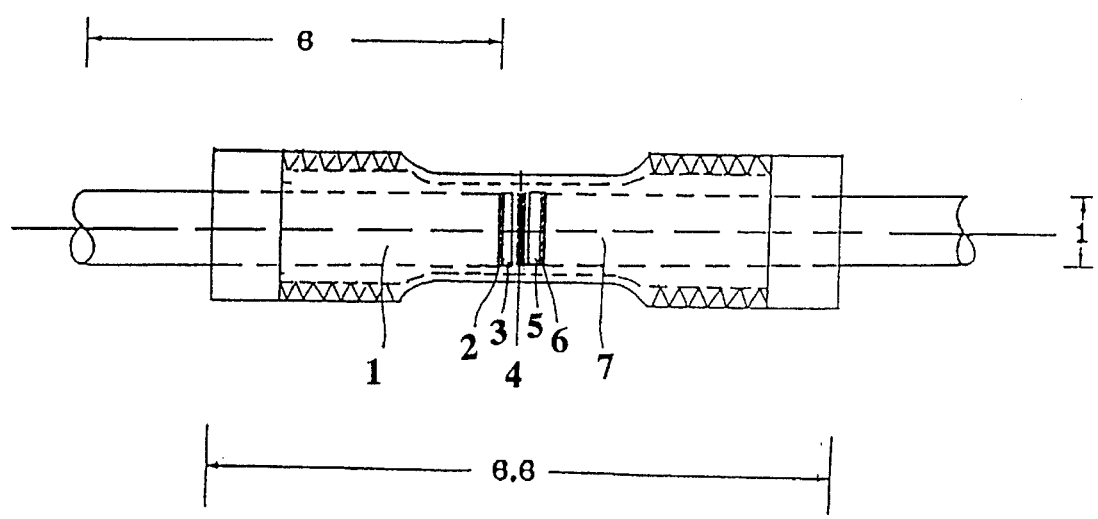
FIG. 2 is a schematic diagram of a test cell of the secondary lithium battery disclosed in the present invention.

FIG. 2 is a schematic diagram of a test cell of the secondary lithium battery disclosed in the present invention. The test cells contains an anode current feeder 1, a copper current collector 2, an anode 3, a separator 4, a cathode 5, an aluminum current collector 6, and a cathode current feeder 7. The anode was prepared from the hydrogen form of layered titanium phosphate prepared above. A mixture containing 85 wt % of the LTP powder, 5 wt % of acetylene black, and 10 wt % of PVDF (polyvinylidene fluoride) was prepared and blended. An appropriate solvent was added to the mixture which was thoroughly blended to form an electrode slurry. The electrode slurry was coated onto an aluminum foil to form an anode plate. A cathode was prepared in a similar manner. A mixture containing 85 wt % LiCoO$_2$ powder, 5 wt % acetylene black, and 10 wt % PVDF was prepared and blended. An appropriate solvent was added to the mixture which was thoroughly blended to form an electrode slurry. The electrode slurry was similarly coated onto an aluminum foil to form a cathode plate. The first type of electrolyte was used in the battery which contained 1M LiClO$_4$ dissolved in a 1:1 mixture solvent of EC (ethylene carbonate) and DMC (dimethyl carbonate).

Figure 3:
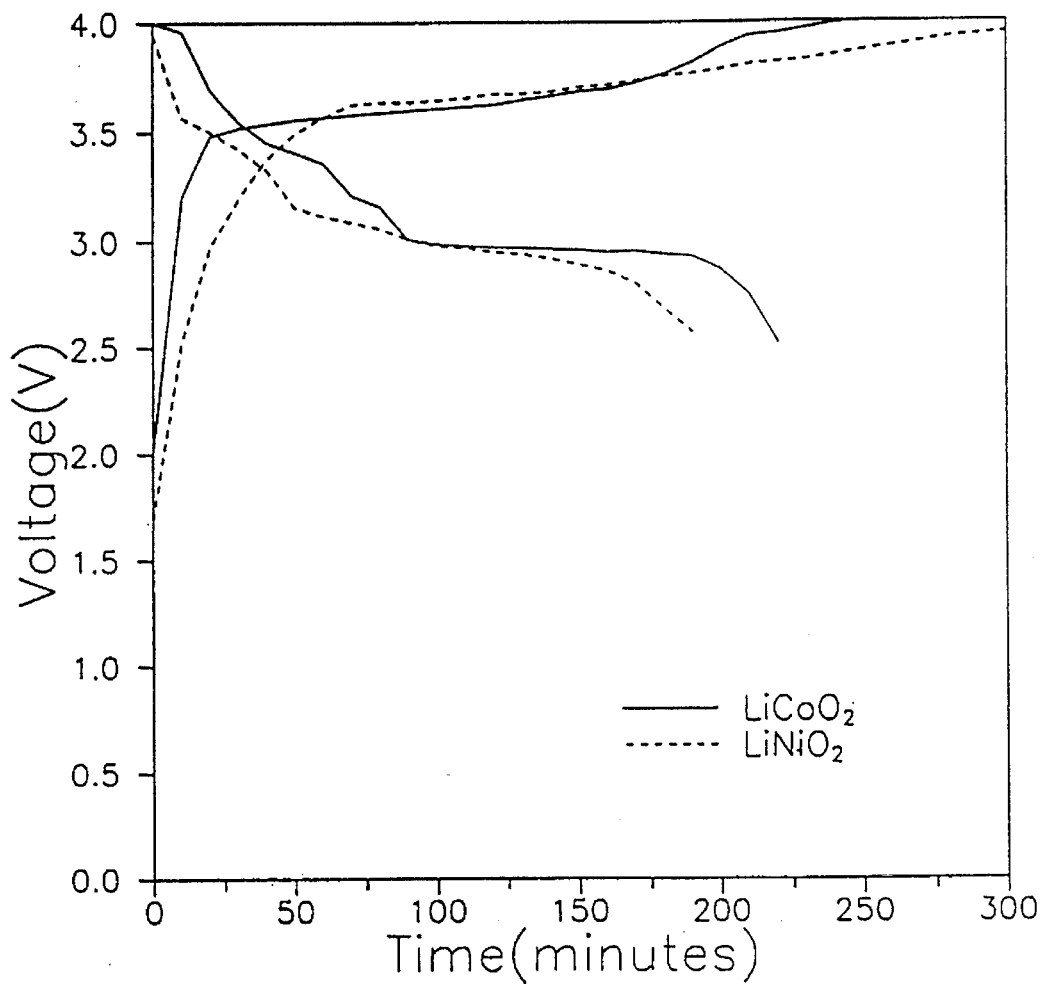
FIG. 3 shows the charge and discharge curves of the LTP/LiCoO$_2$&LiNiO$_2$ cells prepared in the present invention.

The secondary lithium battery prepared above was charged under a current density of 0.8 mA/cm$^2$ until a termination voltage of 4 volt was reached. Then the charged battery was discharged at a current density of 0.4 mA/cm$^2$ until a termination voltage of 2.5 volt was reached. The test results are summarized in FIG. 3, which shows the charge and discharge curves of the LTP/LiCoO$_2$&LiNiO$_2$ cells prepared in the present invention. After an initial drop from 4 volt to 3 volt, a steady working voltage of 3 volt was maintained during the battery discharge operation.

EXAMPLE 2

The battery preparation and test conditions in Example 2 were identical to those in Example 1, except that LiNiO$_2$ was used as the cathode material. The test results were summarized in FIG. 3. After an initial drop from 4 volt to 3 volt, a steady working voltage of 3 volt was maintained during the battery discharge operation.

EXAMPLE 3

Figure 4:
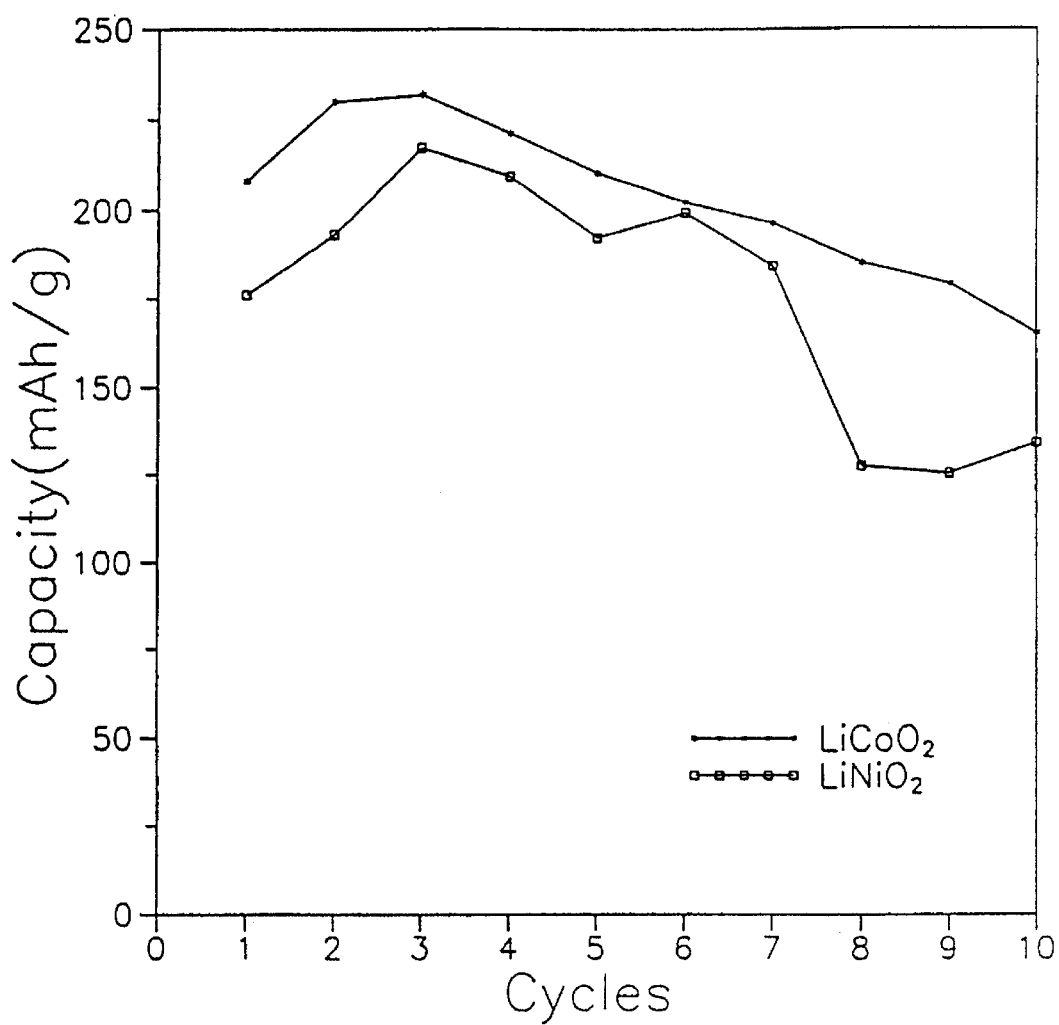
FIG. 4 shows the variation in the discharge capacities between the LTP/LiCoO$_2$&LiNiO$_2$ cells prepared in the present invention as a function of the discharge/recharge cycle.

The LTP/LiCoO$_2$&LiNiO$_2$ cells prepared in the previous examples were repeated discharged and re-charged to evaluate their capacity as a function of the discharge/recharge cycle. In the first ten cycles, the average discharge capacity for the LTP/LiCoO$_2$ cell was 200 mAh/g, and was 175 mAh/g for the LTP/LiNiO$_2$ cell. No lithium dendrites were observed in the discharge/recharge cycle. FIG. 4 shows the variation in the discharge capacities between the LTP/ LiCoO$_2$&LiNiO$_2$ cells prepared in the present invention as a function of the discharge/recharge cycle. These results show that an average discharge capacity of 175~200 mAh/g can be obtained using the LTP/LiCoO$_2$ or LiNiO$_2$ cell, this valve is in the same range as those provided using the coke-type carbon powder as anode material.

EXAMPLE 4

Figure 5:
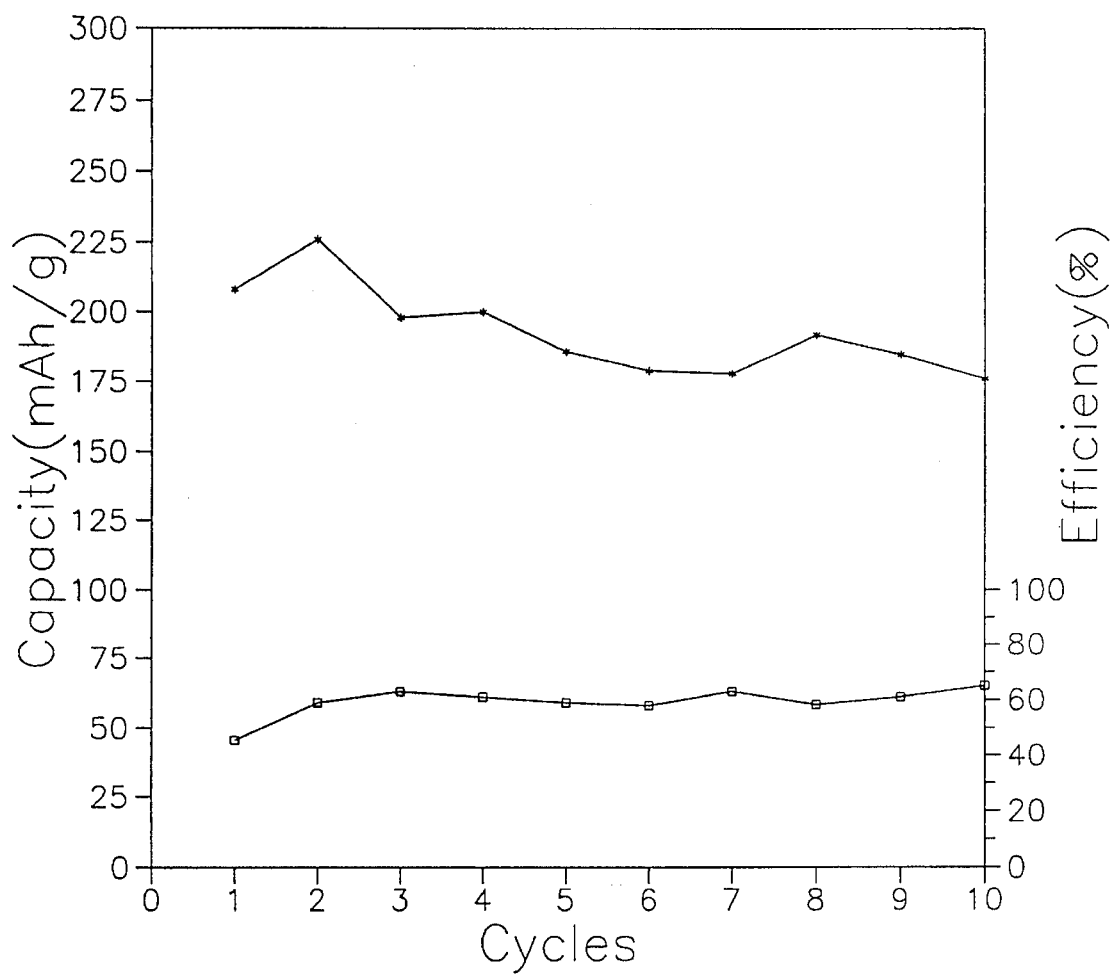
FIG. 5 shows the capacity and efficiency of an LTP/LiCoO$_2$ cell in PC:DEC=1:1+1M LiClO$_4$ prepared in the present invention.

The battery preparation and test conditions in Example 4 were identical to those in Example 1, except that the second type of electrolyte was used which contained 1M LiClO$_4$ dissolved in a 1:1 mixture solvent of PC (propylene carbonate) and DEC (diethyl carbonate). The battery was charged under a current density of 0.8 mA/cm$^2$ until a termination voltage of 4 volt was reached. The charged battery was discharged at a current density of 0.4 mA/cm$^2$ until a termination voltage of 2.5 volt was reached. FIG. 5 shows the capacity and efficiency of an LTP/LiCoO$_2$ cell in the PC:DEC =1:1+1M LiClO$_4$ electrolyte. In the first ten of such discharge/recharge cycles, an average discharge capacity of 195 mAh/g was obtained, indicating an average efficiency of about 60%.

EXAMPLE 5

Figure 6:
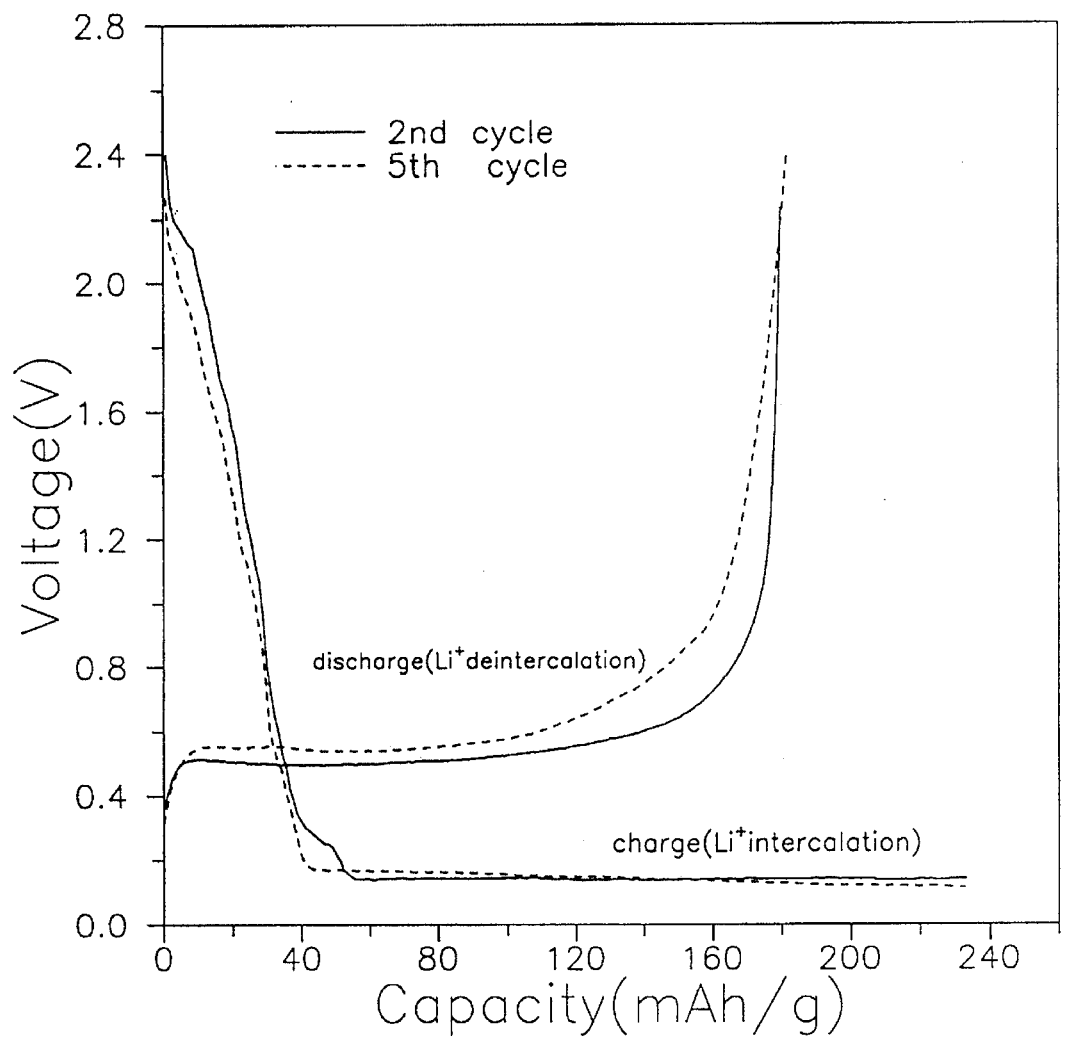
FIG. 6 shows the charge (intercalation) and discharge (deintercalation) curves of a Li/LTP cell.

In Example 5, a Li/LTP cell was prepared to study lithium intercalation in LTP. A Li/LTP cell was prepared using Li as anode and LTP as cathode material. The electrolyte consisted of 1M LiClO$_4$ dissolved in a 1:1 mixture solvent of EC (ethylene carbonate) and DMC (dimethyl carbonate). The battery was charged (i.e., intercalated) under a current density of 0.4 mA/cm$^2$ until a termination voltage of 0.1 volt was reached, then discharged (i.e., deintercalated) at a current density of 0.2 mA/cm$^2$ until a termination voltage of 2.4 volt was reached. FIG. 6 shows the charge and discharge curves of the Li/LTP cell prepared in this example. A stable working voltage of 0.14 volt was maintained during the charging (i. e., intercalation) operation. Likewise, a stable working voltage of 0.5 volt was also maintained during the discharging (i.e., deintercalation) operation. No lithium dendrites were observed in the intercalation/deintercalation cycles.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A secondary lithium battery comprising:
    (a) a cathode;
    (b) an electrolyte solution or a solid electrolyte;
    (c) an anode containing a layered titanium phosphate represented by the formula of TiO(OH)(H$_2$PO$_4$).

2. The secondary lithium secondary battery according to claim 1 wherein said anode containing about 85 wt % of said layered titanium phosphate, about 5 wt % of acetylene black, and about 10 wt % of polyvinylidene fluoride.

3. The secondary lithium secondary battery according to claim 1 wherein said cathode containing about 85 wt % LiCoO$_2$ powder, 5 wt % acetylene black, and 10 wt % polyvinylidene fluoride.

4. The secondary lithium secondary battery according to claim 1 wherein said cathode containing about 85 wt % LiNiO$_2$ powder, 5 wt % acetylene black, and 10 wt % polyvinylidene fluoride.

5. The secondary lithium secondary battery according to claim 1 wherein said electrolyte solution containing about 1M LiClO$_4$ dissolved in a 1:1 mixture solvent of ethylene carbonate and dimethyl carbonate.

6. The secondary lithium secondary battery according to claim 1 wherein said electrolyte solution containing about 1M LiClO$_4$ dissolved in a 1:1 mixture solvent of propylene carbonate and diethyl carbonate.

7. The secondary lithium battery according to claim 1 wherein said layered titanium phosphate is prepared from a process comprising the following steps:
    (a) preparing a reaction mixture containing tetramethylammonium hydroxide, orthophosphoric acid, and titanium dioxide in a molar ratio of X:Y:1, wherein Y$\geq$1 and (0.25 Y)$\leq$X$\leq$1;
    (b) reacting said reaction mixture to form a tetramethylammonium form of layered titanium phosphate; and
    (c) placing said tetramethylammonium form of layered titanium phosphate in a concentrated hydrochloric acid to effectuate a cation exchange reaction and form said hydrogen form of layered titanium phosphate.

8. The secondary lithium secondary battery according to claim 7 wherein said reaction in step (b) being conducted in a sealed pressure reactor at a temperature above 150° C.

9. The secondary lithium secondary battery according to claim 7 wherein said ion exchange reaction in step (c) being conducted in hydrochloric acid at room temperature.

10. A method to prepare a layered titanium phosphate for use as an anode material in a secondary lithium secondary battery wherein said hydrogen form of layered titanium phosphate is represented by the formula of TiO(OH)(H$_2$PO$_4$), and said method comprising the following steps:
    (a) preparing a reaction mixture containing tetramethylammonium hydroxide, orthophosphoric acid, and titanium dioxide in a molar ratio of X:Y:1, wherein Y$\geq$1 and (0.25 Y)$\leq$X$\leq$1;
    (b) reacting said reaction mixture to form a tetramethylammonium form of layered titanium phosphate; and
    (c) placing said tetramethylammonium form of layered titanium phosphate in a concentrated hydrochloric acid to effectuate a cation exchange reaction and form said hydrogen form of layered titanium phosphate.

11. The method to prepare a hydrogen form of layered titanium phosphate for use as an anode material in a secondary lithium secondary battery according to claim 10 wherein said reaction in step (b) being conducted in a sealed pressure reactor at a temperature above 150° C.

12. The method to prepare a hydrogen form of layered titanium phosphate for use as an anode material in a secondary lithium secondary battery according to claim 10 wherein said ion exchange reaction in step (c) being conducted in hydrochloric acid at room temperature.

* * * * *